(12) United States Patent
Schmidt

(10) Patent No.: US 6,921,258 B1
(45) Date of Patent: Jul. 26, 2005

(54) EJECTOR DEVICE FOR AN INJECTION MOLDING MACHINE FOR PLASTICS

(75) Inventor: Holger Schmidt, Bad Frankenhausen (DE)

(73) Assignee: Demag Ergotech GmbH, Schwaig (DE)

( * ) Notice: Subject to any disclaimer, the term of this patent is extended or adjusted under 35 U.S.C. 154(b) by 56 days.

(21) Appl. No.: 10/203,306

(22) PCT Filed: Oct. 4, 2000

(86) PCT No.: PCT/DE00/03575

§ 371 (c)(1),
(2), (4) Date: Aug. 6, 2002

(87) PCT Pub. No.: WO01/58659

PCT Pub. Date: Aug. 16, 2001

(30) Foreign Application Priority Data

Feb. 7, 2000 (DE) ........................................ 100 05 676

(51) Int. Cl.[7] .............................................. B29C 45/40
(52) U.S. Cl. ...................................... 425/556; 425/444
(58) Field of Search ................................ 425/422, 444, 425/556, 351

(56) References Cited

U.S. PATENT DOCUMENTS

| | | | | |
|---|---|---|---|---|
| 1,781,339 A | * | 11/1930 | Oliver et al. ............... | 425/412 |
| 3,752,622 A | * | 8/1973 | Vladana ....................... | 425/78 |
| 3,807,682 A | * | 4/1974 | Catinella et al. ............... | 249/68 |
| 3,807,915 A | * | 4/1974 | Rees ....................... | 425/436 R |
| 4,635,463 A | * | 1/1987 | Dumschat ..................... | 72/427 |
| 5,067,892 A | * | 11/1991 | Rahn et al. .................. | 425/556 |
| 5,481,147 A | * | 1/1996 | Kaplan et al. ............... | 310/181 |
| 6,113,376 A | * | 9/2000 | Eppich ....................... | 425/190 |
| 6,183,235 B1 | | 2/2001 | Taniguchi et al. .......... | 425/139 |
| 6,478,566 B1 | * | 11/2002 | Ito et al. ..................... | 425/154 |
| 2002/0110616 A1 | * | 8/2002 | Meschia ..................... | 425/556 |

FOREIGN PATENT DOCUMENTS

EP 0585 671 A1 8/1993 ........... B29C/45/40

* cited by examiner

Primary Examiner—Benjamin L. Utech
Assistant Examiner—Emmanuel S. Luk
(74) Attorney, Agent, or Firm—Cohen, Pontani, Lieberman & Pavane

(57) ABSTRACT

The invention relates to an ejector device for an injection-molding machine for plastics, having at least one ejector pin, which can be moved toward the mold and away from the latter through the center of a moveable die clamping plate by an actuator. In this arrangement, the actuator provided is a linear motor (21), which is arranged outside the central axis (I) on the moveable clamping plate (11), and bar-shaped force-transmission elements (30), by means of which the linear motor can be brought into operative connection with the ejector pin (41), are provided.

22 Claims, 5 Drawing Sheets

EJECTOR DEVICE FOR AN INJECTION MOLDING MACHINE FOR PLASTICS

PRIORITY CLAIM

This is a U.S. national stage of application No. PCT/DE00/03575, filed on Oct. 4, 2000. Priority is claimed on that application and on the following application: Country: Germany, Application No.: 100 05 676.8, Filed: Feb. 7, 2000.

BACKGROUND OF THE INVENTION

1. Description

The invention relates to an ejector device for an injection-molding machine for plastics, having at least one ejector pin, which can be moved toward the mold and away from the latter through the center of a moveable die clamping plate by an actuator.

2. Description of the Related Art

EP 0 585 671 A1 has disclosed an ejector for molding dies in the case of injection-molding machines, in which an electric motor provided on a mold mounting plate is seated, the motor being connected continuously, for purposes of actuation, by means of a mechanism to a rotatable threaded spindle, which is connected to an ejector plunger.

EP 0 890 426 A2 has disclosed a device in which a servomotor is connected by an endless belt to a recirculating-ball screw, which is in operative connection with an ejector pin.

The ejector units known from the above-mentioned documents not only suffer from the disadvantage of a complex construction but also of not inconsiderable wear.

SUMMARY OF THE INVENTION

It is an object of the invention to provide an ejector device for an injection-molding machine which, while being of simple structural design and economical in terms of energy consumption, requires little maintenance and is reliable and takes up only a little free space in the region of the drive for the moveable die clamping plate.

According to the invention, a linear motor is provided outside the central axis of the injection-molding machine and is connected to the ejector pin by means of bar-shaped force-transmission elements. The linear motor is secured on the moveable die plate and arranged parallel or at right angles to the principal axis of the latter.

In a refinement of the invention, a two-armed lever is used, the end of which is connected to the ejector pin and the other end of which is connected by means of a compression link to the linear motor and which is connected approximately centrally, by means of a tension link, to the movable die clamping plate.

In another refinement of the invention, a two-armed lever is provided, the end of which is connected to the ejector pin, the other end of which is connected to the linear motor by means of a compression link, and which is connected approximately centrally to the moveable die clamping plate by means of a tension link.

The two-armed lever is configured in such a way that the lever ratios are adjustable and, in a refinement, the lever has various holding elements, while, in a further refinement, the lever is of telescopic configuration to enable the lever ratios of the lever component a which is oriented toward the linear motor and/or the lever component b which is oriented toward the ejector pin to be adjusted.

In a further refinement of the invention, a mechanism formed by a two-armed and a one-armed lever is provided, permitting linear guidance of the ejector pin over a sufficient range. This refinement makes it possible to dispense with the use of a bearing for the ejector pin. Insofar as bearings are used, sliding bearings, in particular porous bearings, are provided.

The linear motors used are electric motors, which have recirculating-ball or planetary-roller screws. It is furthermore proposed to use reluctance motors as linear motors, in which the comb-shaped inductor is connected either to the moveable die clamping plate or, by means of a compression or tension link, to the two-armed lever.

In a further refinement of the invention, a rigid lever is used, which is driven by a linear motor arranged parallel to the principal axis.

DETAILED DESCRIPTION OF THE PRESENTLY PREFERRED EMBODIMENTS

Figure 1:
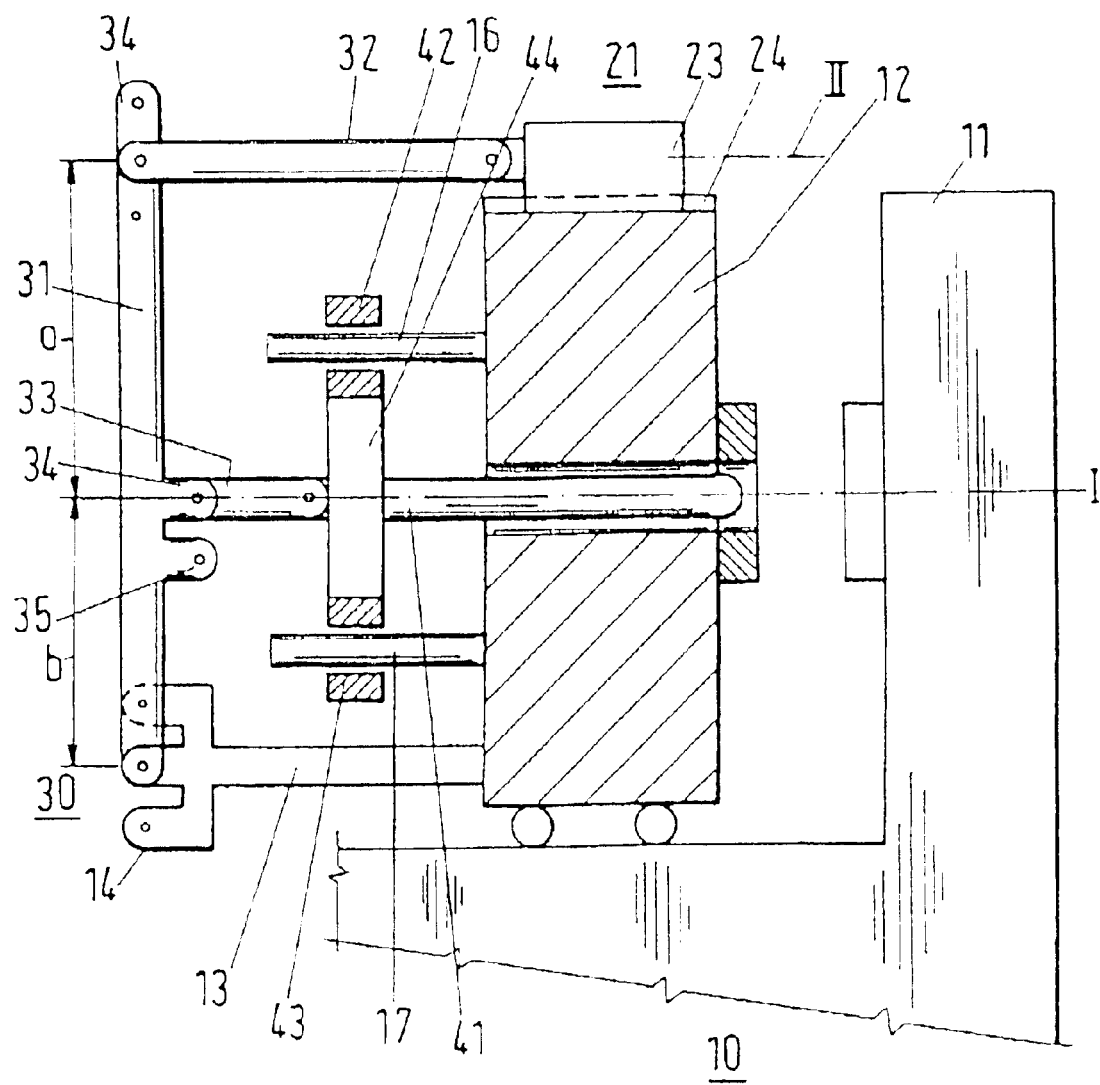
FIG. 1 shows an ejector device with a two-armed lever, which drives the ejector pin centrally.

All the figures show a fixed die clamping plate 11 and a moveable die clamping plate 12 of an injection-molding machine 10. Secured on the moveable die clamping plate 12 there is in each case a linear motor 21, which is in operative connection via force-transmission elements 30 in the form of levers with an ejector pin 41, which can be passed centrally through the moveable die clamping plate 12.

In FIG. 1, the ejector pin 41 is secured on an ejector plate 44, which has bearings 42, 43, which correspond to guide pins 16, 17 attached to the moveable die plate 12.

The ejector plate 44 is connected to a two-armed lever 31 by means of a compression link 33. At one end, the two-armed lever 31 is secured by means of a bracket 13 in a manner that allows angular motion and, at its other end, is connected to the linear motor 21 by means of a tension link 32. The linear motor 21 is configured as a reluctance motor 23, the comb-shaped inductor 24 of which is arranged at the head of the die clamping plate 12, parallel to the principal axis I.

Figure 2:
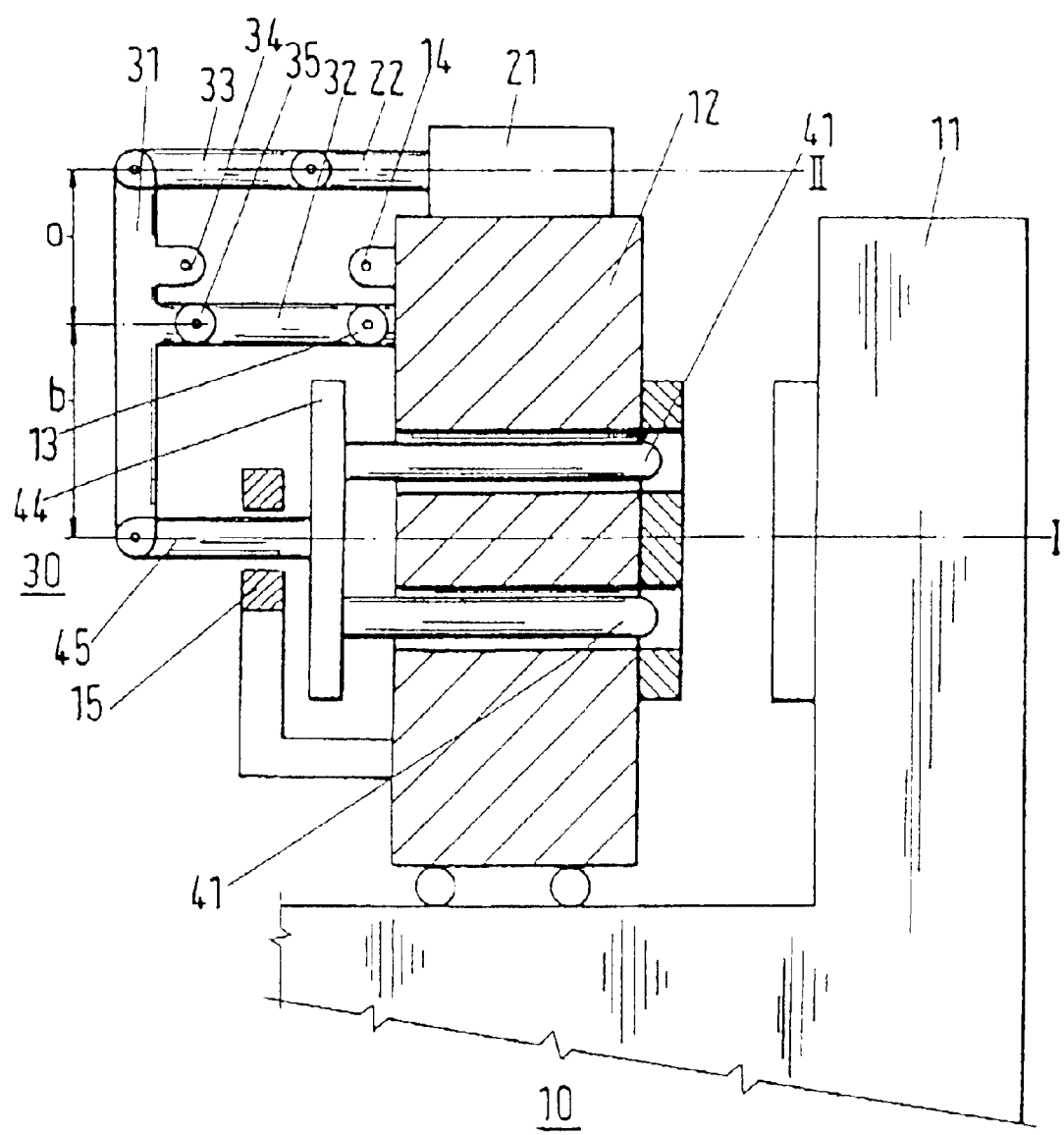
FIG. 2 shows an ejector device with a two-armed lever, in which the ejector pin is arranged at the end.

The ratios of lever-arm component a to lever component b of the two-armed lever 31 can be adjusted by means of holding element 34 and 35 in conjunction with the brackets 13 and 14. In FIG. 2, two ejector pins 41 are provided on the ejector plate 44. In this arrangement, the ejector plate 44 is secured on the holding bar 45, which is guided by a bearing 15, which is secured on the moveable die clamping plate 12.

The end of the holding bar 45 is secured on one end of the two-armed lever 31 in a manner that allows angular motion.

The two-armed lever is held approximately centrally, by means of the tension link 32, on brackets 13 or 14, which are secured on the moveable clamping plate 12.

Provided at the other end of the two-armed lever 31 is a compression link 33, which is in operative connection with a spindle 22 of the linear motor 21 provided here.

Figure 3:
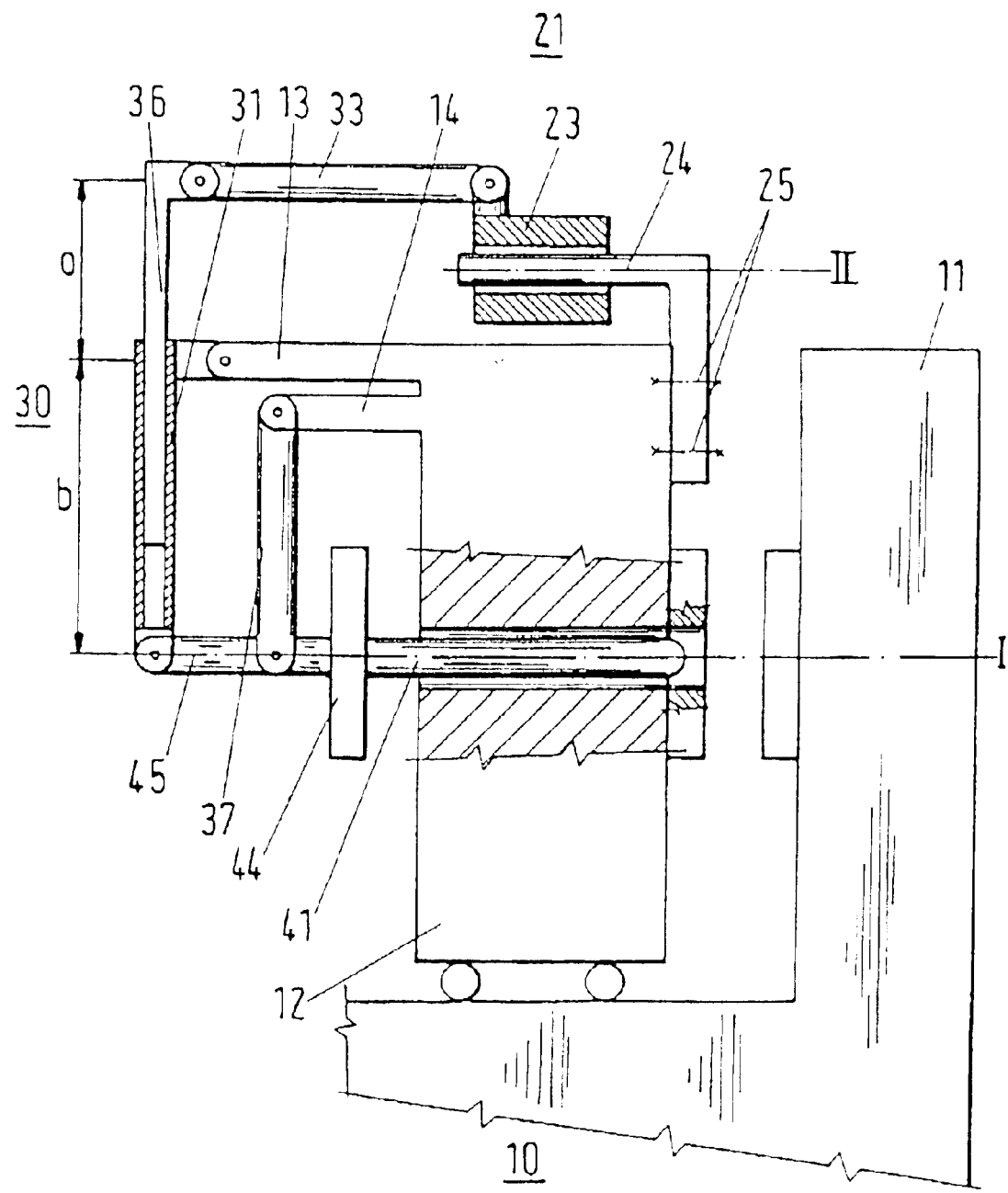
FIG. 3 shows an ejector device in which the levers form a mechanism.

In FIG. 3, the holding bar 45 connected to the ejector plate 44, on which the ejector pin 41 is situated, is connected both to a one-armed lever 37 and to the two-armed lever 31. At the same time, the one-armed lever 37 is connected at the other end to a bracket 14, and the two-armed lever 31 is connected approximately centrally, by means of a bracket 13, to the moveable die clamping plate. The points of articulation and the lever ratios are matched to one another in such a way that the ejector pin 41 is guided along the central axis I over a sufficiently long distance.

The two-armed lever 31 is configured as a telescope, allowing the ratios of the lever arms a and b to be adjusted in an infinitely variable manner as required.

One end of the two-armed lever 31 is connected by a compression link 33 to the linear motor 21, which is configured as a reluctance motor 23. The comb-shaped inductor 24 has adjusting element 25, which allow the axis II of motion to be adjusted relative to the central axis I.

Figure 4:
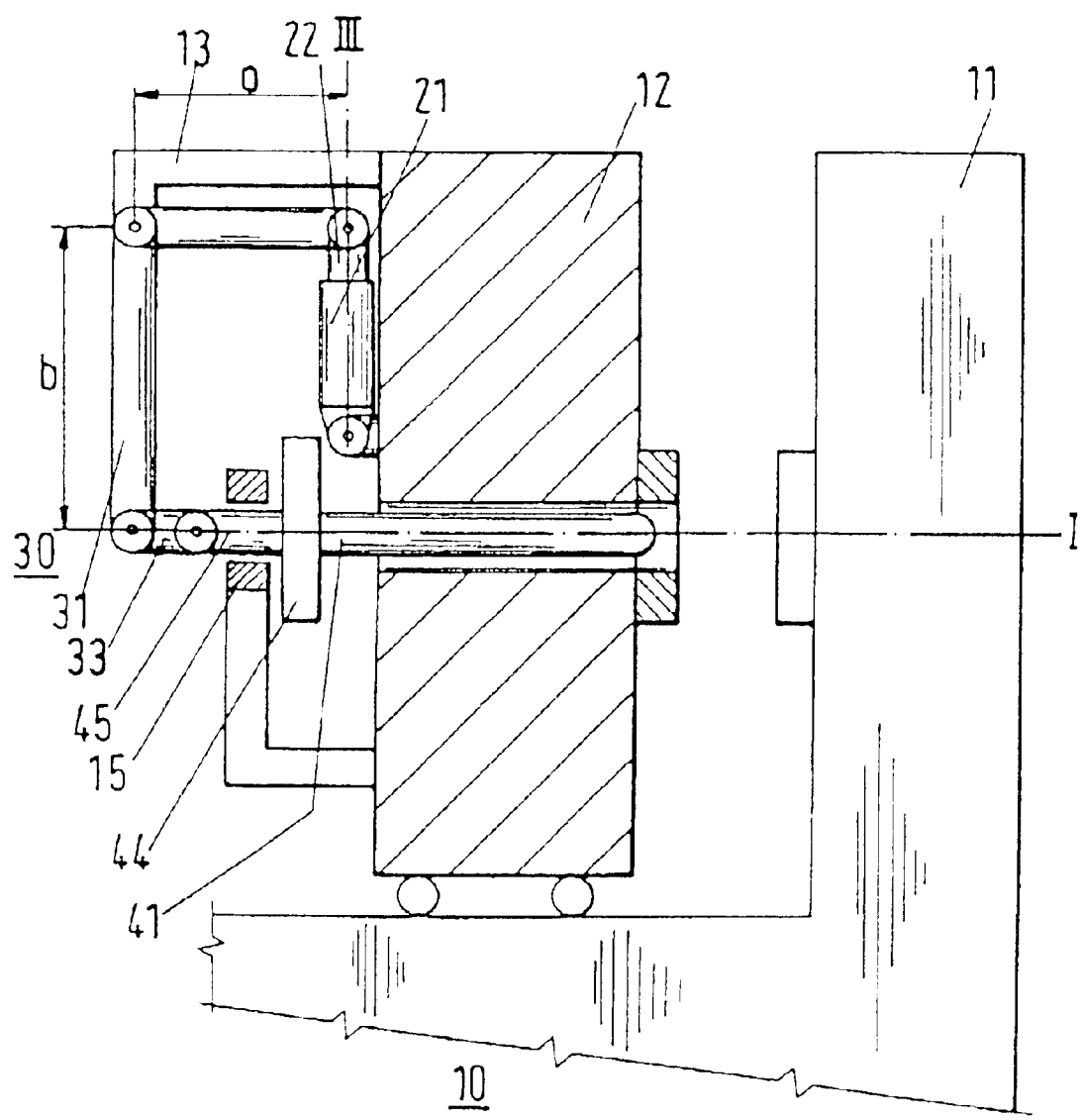
FIG. 4 shows an ejector device in which the linear motor is arranged perpendicularly to the principal axis.

In FIG. 4, the axis III of motion is provided perpendicularly to the central axis I. In this arrangement, the linear motor 21 used is held on a bracket 13, 14 in a manner that allows angular motion.

The two-armed lever 31 has an angular configuration and is connected approximately centrally to the moveable die clamping plate 12 at a bracket 13 in a manner that allows angular motion.

Provided at the other end of the two-armed lever 31 is a compression link 33, which is connected to the holding bar 45, which is connected to the ejector plate 44 and the ejector pin 41 secured thereon.

The holding bar 45 is mounted in a bearing 15, which is connected to the moveable clamping plate 12.

Figure 5:
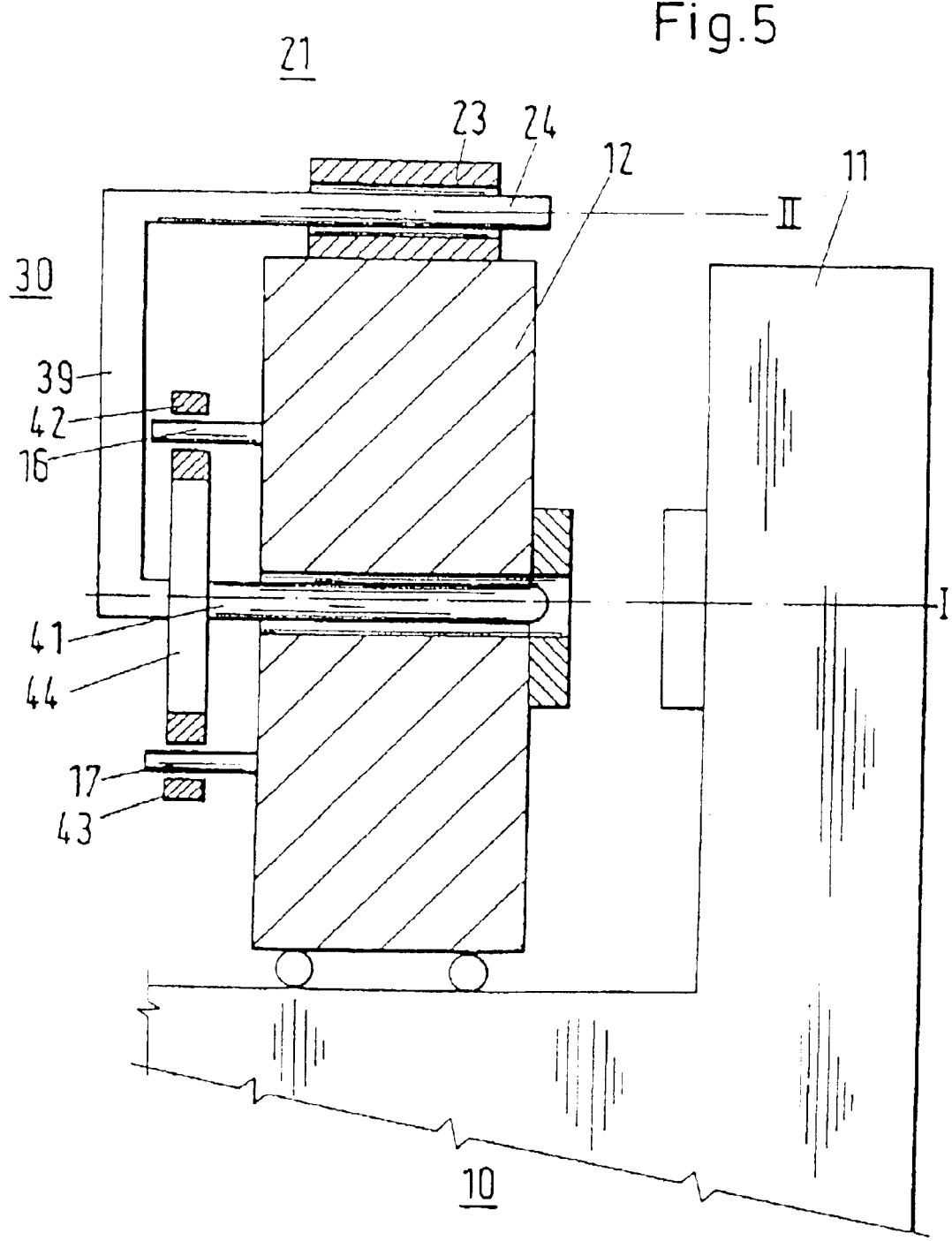
FIG. 5 shows an ejector device with a rigid lever.

FIG. 5 has an ejector pin 41, which is connected to an ejector plate 44 and is in operative connection with the linear motor 21 via a rigid arm 39. One end of the rigid arm 39 forms the comb-shaped inductor 24 of the reluctance motor 23.

The ejector plate 44 connected to the rigid arm 39 is mounted by means of the bearings 42 and 43 on guide pins 16 and 17, which are secured on a moveable die clamping plate 12.

What is claimed is:

1. An ejector device for ejecting a molding from the dies of an injection molding machine for plastic, said machine having a moveable die clamping plate with a central axis, said ejector device comprising:
    at least one ejector pin which can be moved toward and away from the dies through the moveable die clamping plate,
    a linear motor mounted on the moveable die clamping plate outside the central axis of the moveable die clamping plate for moving the ejector pin toward and away from the dies, said linear motor having an axis of motion,
    a two-armed lever having a pair of opposed ends, one of said ends being connected to the ejector pin,
    a compression link connecting the other of said ends to the linear motor, and
    a tension link connecting the two-armed lever to the moveable clamping plate between said ends,
    whereby said linear motor can push on said compression link so that said two-armed lever pulls on said tension link so that said ejector pin can eject a molding from said moveable die clamping plate.

2. An ejector device as in claim 1 wherein said two-armed lever comprises a first lever component on one side of said tension link and connected to said linear motor, and a second lever component on the other side of said tension link and connected to said ejector pin, said tension link being connectable to said two-armed lever at a plurality of points, whereby the length of said lever components can be varied.

3. An ejector device as in claim 1 further comprising a pair of brackets provided on said moveable die clamping plate, a holding bar fixed to said ejector pin, and a one-armed lever arranged substantially in parallel to said two-armed lever for moving the ejector pin linearly along the central axis over a specified range, said two armed lever having said one of said ends pivotably connected to said holding bar, said other of said ends pivotably connected to said linear motor by said compression link, and an intermediate portion pivotably connected to one of said brackets, said one-armed lever having one end pivotably connected to said holding bar, and another end pivotably connected to the other of said brackets.

4. An ejector device as in claim 1 further comprising a bearing provided on the moveable die clamping plate, said ejector pin moving through said bearing.

5. An ejector device as in claim 4 wherein said bearing is a sliding bearing.

6. An ejector device as in claim 1 further comprising
    at least two guide pins provided on said moveable die clamping plate, and
    an ejector plate on which said at least one ejector pin is fixed, said ejector plate having at least two bearings which receive respective said guide pins therethrough.

7. An ejector device as in claim 6 wherein said bearings are sliding bearings.

8. An ejector device as in claim 1 wherein said linear motor comprises an electric motor driving one of a recirculating ball screw and a planetary roller screw.

9. An ejector device as in claim 1 wherein said linear motor is a reluctance motor.

10. An ejector device as in claim 9 wherein said reluctance motor comprises a comb-shaped inductor which is fixed to said moveable die clamping plate.

11. An ejector device as in claim 10 wherein said comb-shaped inductor is fixed to said moveable die clamping plate by adjusting elements which permit adjustment in a direction orthogonal to said central axis.

12. An ejector device as in claim 1 wherein said two-armed lever comprises a pair of lever components which are telescopically connected.

13. An ejector device for ejecting a molding from the dies of an injection molding machine for plastic, said machine having a moveable die clamping plate with a central axis, said ejector device comprising:
    at least one ejector pin which can be moved toward and away from the dies through the moveable die clamping plate,
    a linear motor mounted on the moveable die clamping plate outside the central axis of the moveable die clamping plate for moving the ejector pin toward and away from the dies, said linear motor having an axis of motion,
    a bracket fixed to said moveable die clamping plate,
    a two-armed lever having a pair of opposed ends, one of said ends being pivotably connected to said bracket,
    a tension link connecting the other of said ends to said linear motor, and
    a compression link connecting the two-armed lever to the ejector pin between said ends,
    whereby said linear motor can pull on said tension link so that said two-armed lever pushes said compression link so that said ejector pin can eject a molding from said moveable die clamping plate.

14. An ejector device as in claim 13 wherein said two-armed lever comprises a first lever component on one side of said compression link and connected to said linear motor, and a second lever component on the other side of said compression link and connection to said ejector pin, said compression link being connectable to said two-armed lever at a plurality of points, whereby the length of said lever components can be varied.

15. An ejector device as in claim 13 further comprising a bearing provided on the moveable die clamping plate, said ejector pin moving through said bearing.

16. An ejector device as in claim 15 wherein said bearing is a sliding bearing.

17. An ejector device as in claim 13 further comprising:

at least two guide pins provided on said moveable die clamping plate, and an ejector plate on which said at least one ejector fin is fixed, said ejector plate having at least two bearings which receive respective said guide pins therethrough.

18. An ejector device as in claim 17 wherein said bearings are sliding bearings.

19. An ejector device as in claim 13 wherein said linear motor comprises an electric motor driving one of a recirculating ball screw and a planetary roller screw.

20. An ejector device as in claim 13 wherein said linear motor is a reluctance motor.

21. An ejector device as in claim 20 wherein said reluctance motor comprises a comb-shaped inductor which is fixed to said moveable die clamping plate.

22. An ejector device as in claim 21 wherein said comb-shaped inductor is fixed to said moveable die clamping plate by adjusting elements which permit adjustment in a direction orthogonal to said central axis.

* * * * *